United States Patent [19]
Koert

[11] Patent Number: 5,041,834
[45] Date of Patent: Aug. 20, 1991

[54] ARTIFICIAL IONOSPHERIC MIRROR COMPOSED OF A PLASMA LAYER WHICH CAN BE TILTED

[75] Inventor: Peter Koert, Washington, D.C.

[73] Assignee: APTI, Inc., Washington, D.C.

[21] Appl. No.: 524,435

[22] Filed: May 17, 1990

[51] Int. Cl.$^5$ .......................... H04B 7/00; H01Q 3/22
[52] U.S. Cl. ..................... 342/367; 342/372
[58] Field of Search ............... 342/367, 353, 371, 372; 455/64

[56] References Cited

U.S. PATENT DOCUMENTS

| | | | |
|---|---|---|---|
| 3,445,844 | 5/1969 | Grossi et al. | 342/367 |
| 4,253,190 | 2/1981 | Csonka | 455/12 |
| 4,686,605 | 8/1987 | Eastlund | 361/231 |
| 4,712,155 | 12/1987 | Eastlund et al. | 361/231 |
| 4,817,495 | 4/1989 | Drobot | 89/1.11 |

*Primary Examiner*—Gregory C. Issing
*Attorney, Agent, or Firm*—Foley & Lardner

[57] ABSTRACT

This invention relates to generation of a Artificial Ionospheric Mirror (AIM), or a plasma layer in the atmosphere. The AIM is used like the ionosphere to reflect RF energy over great distances. A tiltable AIM is created by a heater antenna controlled in phase and frequency. The heater antenna phase shift scans a beam to paint a plasma layer. Frequency is changed to refocus at continually higher altitudes to tilt the plasma layer.

16 Claims, 15 Drawing Sheets

Phase Corrections to move focal point from 60Km to 61Km

Distance in meters
Frequency correction to move focal point from 60Km to 61Km

Heater focusing at 75 Km with 550 MHz frequency and 154 dBW

Heater Focusing at 75Km with 550 to 559.375 MHz frequency and 154 dBW

Effects of Frequency Chirping: Heater focused at 70 km with 300-308 MHz frequency chirping Pattern of a thinned array antenna with randomized spacing containing no grating lobes Angle theta in degrees
Pattern of a thinned array antenna with uniform spacing containing grating lobes

ARTIFICIAL IONOSPHERIC MIRROR COMPOSED OF A PLASMA LAYER WHICH CAN BE TILTED

BACKGROUND OF THE INVENTION

1. Field of the Invention

This invention relates to generation of a Artificial Ionospheric Mirror (AIM), or a plasma layer in the atmosphere. The AIM is used like the ionosphere to reflect RF energy over great distances.

2. Description of the Related Art

In the past, the technique of using the ionosphere as a mirror to reflect radio waves, or RF energy, has given Ham Radio operators the ability to send transmissions over long distances. This technique has also provided radar systems the ability to look "over the horizon." Variations and fluctuations in the ionosphere, however, can render the effectiveness of such communications uncertain. Thus, the desirability of creating controllable plasma layers in the atmosphere for communications purposes has been recognized. See, for example, U.S. Pat. No. 4,686,605 issued to Eastlund and U.S. Pat. No. 4,712,155 issued to Eastlund et al.

Previous experiments directed toward creating plasma layers for communications have suffered from the inability to control the inclination of the plasma layer so that signals could be transmitted and received from various ranges. In other words, while one could create a plasma layer in the atmosphere at a lower altitude than the ionosphere, point to point communications would be limited in range based on the reflection angles of the transmitted and reflected signals.

SUMMARY AND OBJECTS OF THE INVENTION

In view of the limitations of the related art it is an object of this invention to generate a plasma layer that could be angled or tilted with respect to the horizon in order to affect signal transmission range.

The present invention provides a system and method for generating a plasma layer at controlled altitudes and inclinations that acts as an artificial ionospheric mirror (AIM) to reflect RF signals. The AIM increases the range and predictability with which RF energy may be reflected off the AIM for communications purposes. More specifically, a tiltable AIM is created by a heater antenna controlled in phase and frequency. The heater antenna phase shift scans a beam to paint a plasma layer. The heater antenna continually refocuses at a higher altitudes by frequency shifting to tilt the plasma layer.

BRIEF DESCRIPTION OF THE DRAWINGS

Further details of the present invention are explained with the help of the attached drawings in which.

DETAILED DESCRIPTION OF THE PREFERRED EMBODIMENTS

Figure 1:
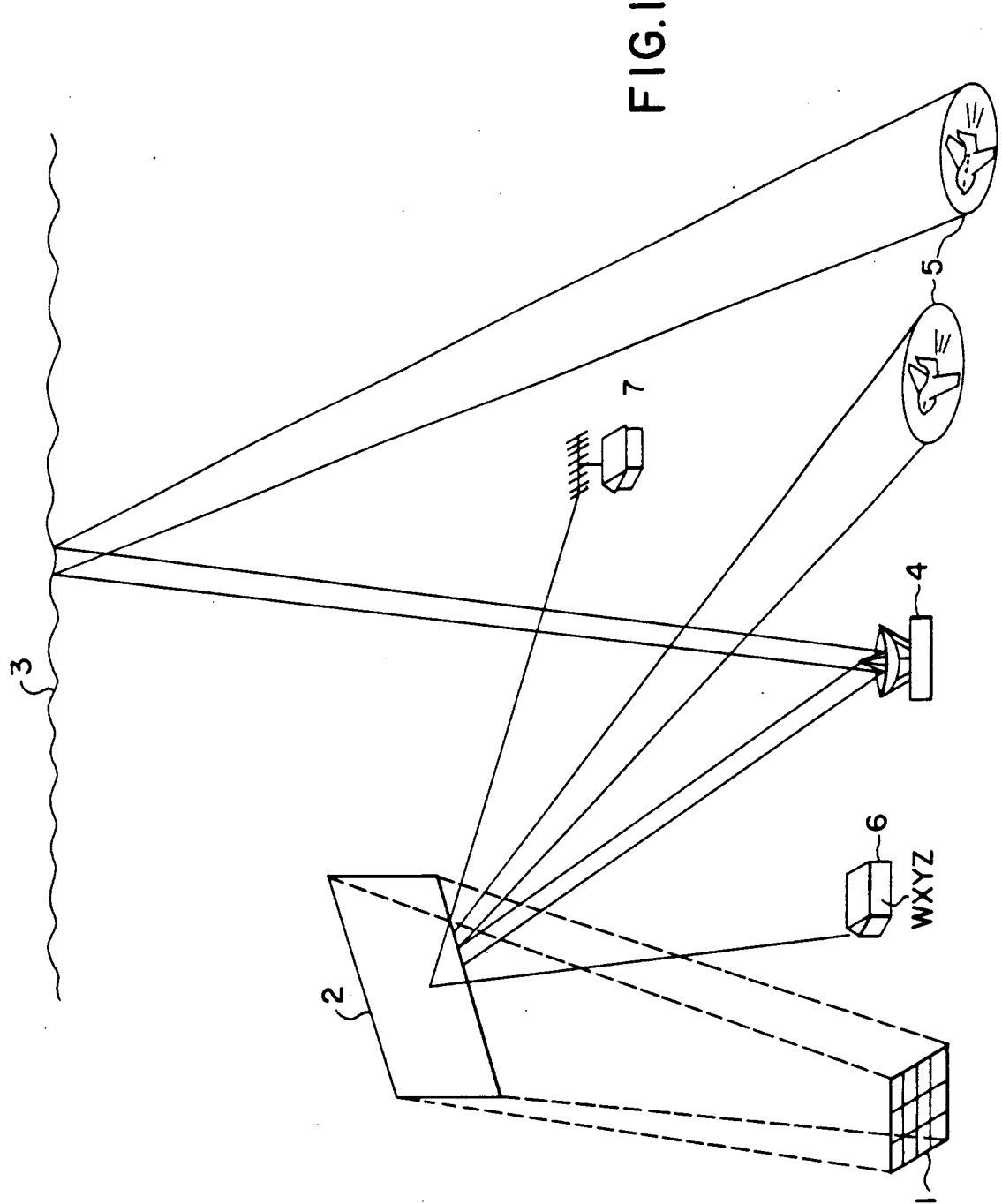
FIG. 1 shows creation of an AIM by a heater antenna and use of the AIM for tracking aircraft and reflecting radio waves.

FIG. 1 illustrates the creation and use of An Artificial Ionospheric Mirror (AIM) for tracking aircraft and reflecting radio waves. A heater antenna 1 radiates power causing avalanche ionization or breakdown releasing free electrons in the atmosphere to generate the AIM 2. The heater antenna 1 is an array which can be used to focus energy at varying altitudes and elevations to tilt the AIM 2 using phase and frequency control. The AIM 2 simulates the ionosphere 3 which is also used to detect "over the horizon targets" 5. In addition, the AIM 2 can reflect radio signals transmitted from a transmitter 6 to a receiver 7 over long distances.

Figure 2:
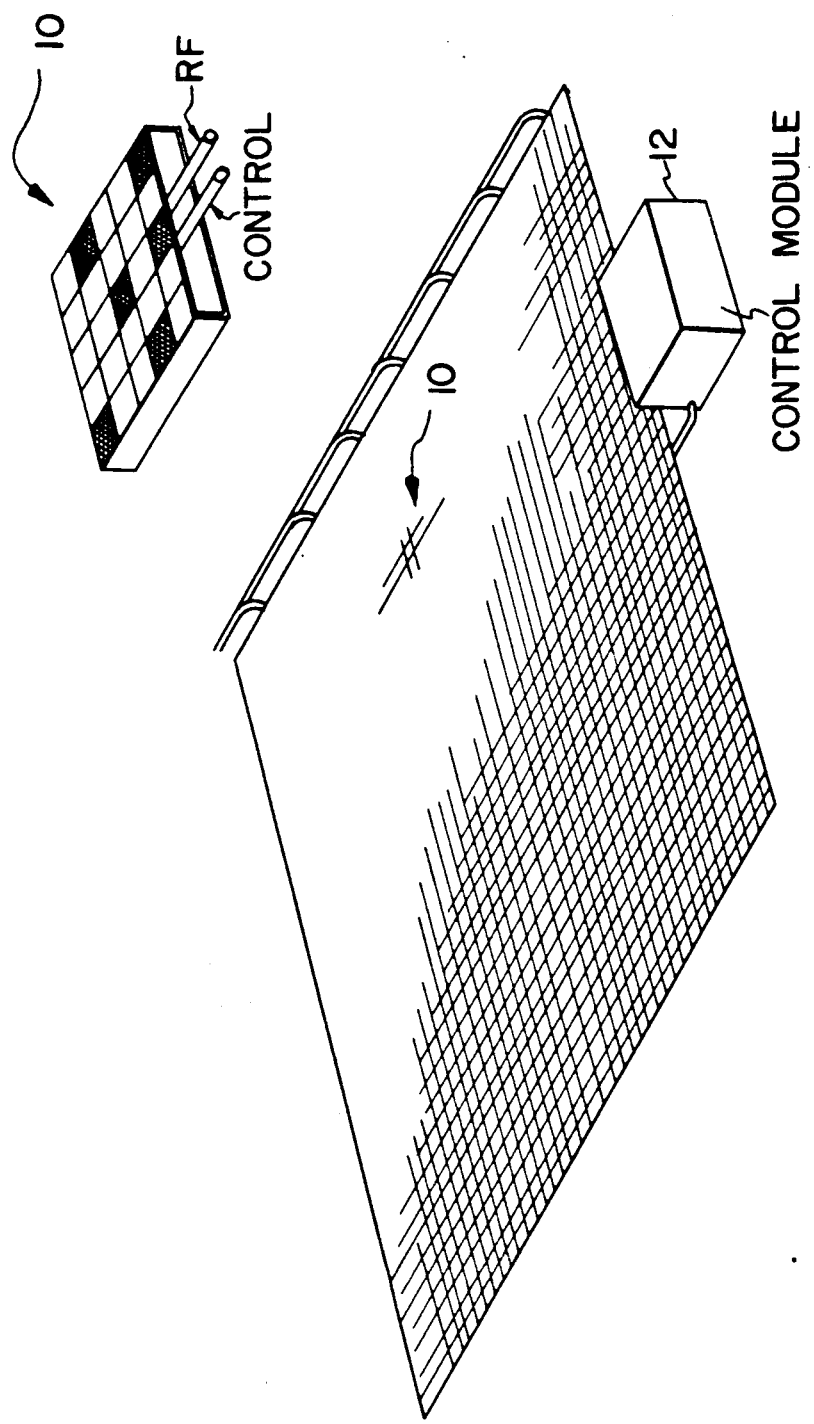
FIG. 2 shows a typical heater array.

A typical heater antenna is shown in FIG. 2. It consists of an array of multiple active radiating elements 10 having their individual phase and frequency controlled from a control module 12. The radiating element 10 is used here to represent all possible antennas, including, but not limited to, dipoles, slots, small or large horns, log-periodic antennas, large parabolic reflectors, etc.

Figure 3:
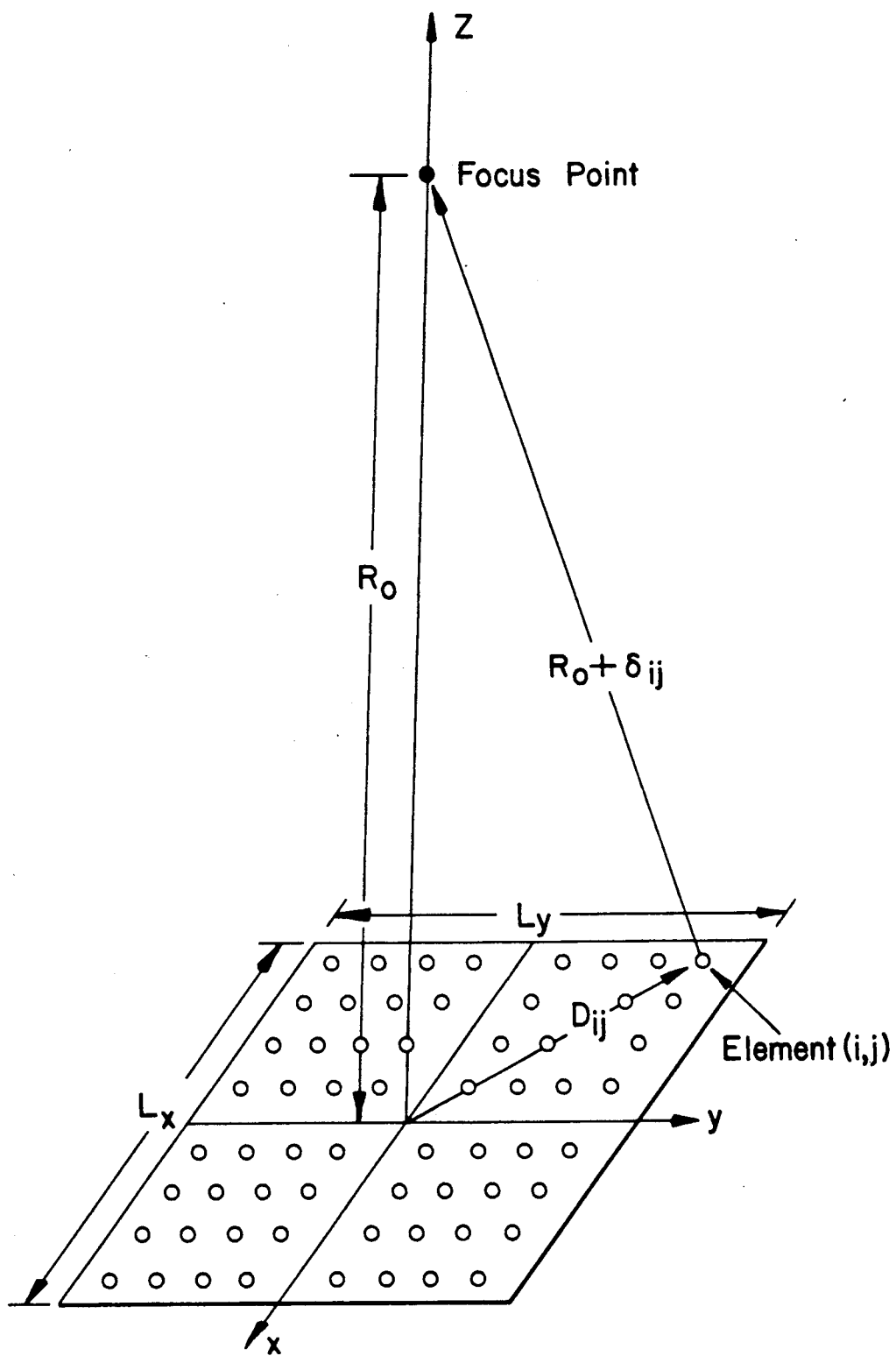
FIG. 3 shows the spacial relationship for a heater array used in defining heater array focusing.

FIG. 3 shows the spatial relationship for a focused heater array. To have the electric fields from all of the array elements focus, or arrive in phase at a distance $R_o$ in the near field of the array, it is necessary to correct the phase of each element to compensate for the phase delay difference from the center element due to the additional phase path $W_{ij}$. If $R_o$ is much larger than the maximum $D_{ij}$ in FIG. 3, then the phase delay can be approximated in wavelength to be:

$$W_{ij} = (D_{ij})^2/(4 \cdot R \cdot g) \qquad (1)$$

where g is the wavelength of the heater frequency. Equation 1 is referred to as the quadratic phase error. If this error is less than g/8 when the element (i,j) is on the outer edge of the array, then the distance $R_o$ is said to be in the far field of the array.

In order to focus the array at $R_o$, it is necessary to have several wavelengths of phase error from the outer elements of the array. That is, the term "focus" is used in this context to mean that the electric field from the array is concentrated in a desired spatial region.

Figure 4:
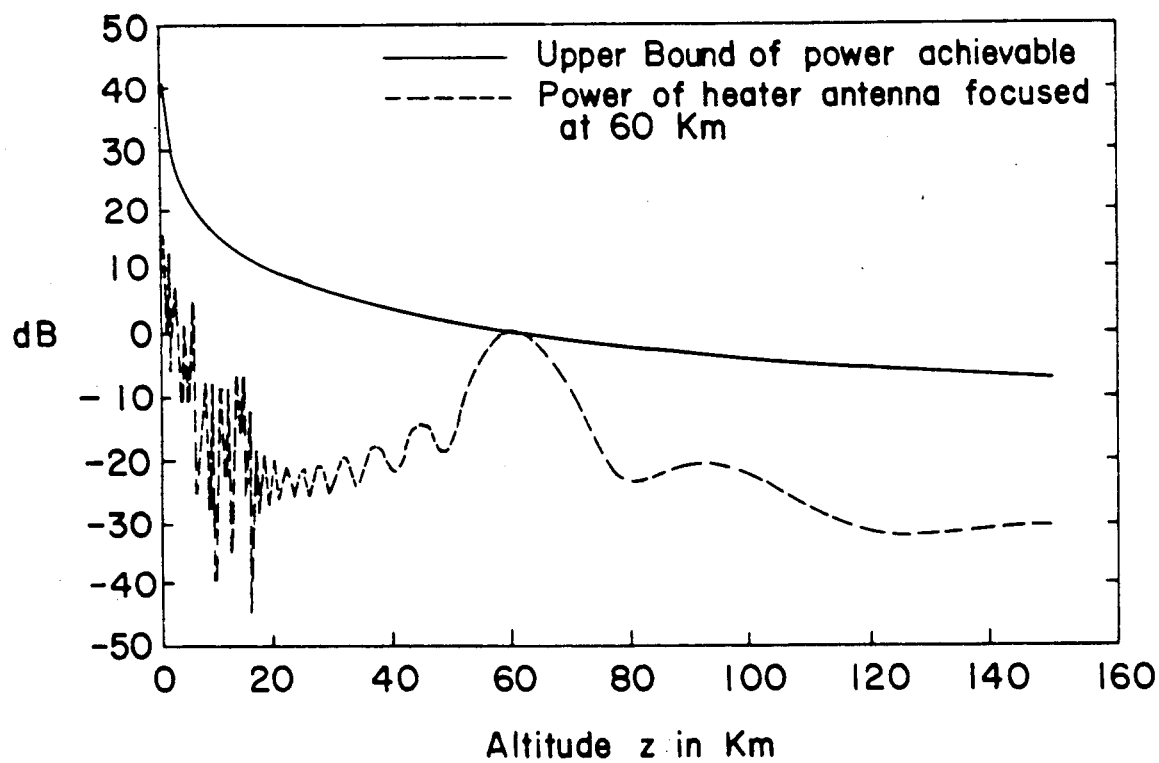
FIG. 4 is a graph showing that power is at its upper bound at the antenna focal point.

FIG. 4 shows the degree of focusing that can be accomplished. This is a vertical pattern of an array whose elements have been phase shifted to focus at 60 Km. The array has 400 elements with a total width and length of 2000 g. The peak of the pattern is determined by the $1/R_0^2$ dependence.

Figure 5:
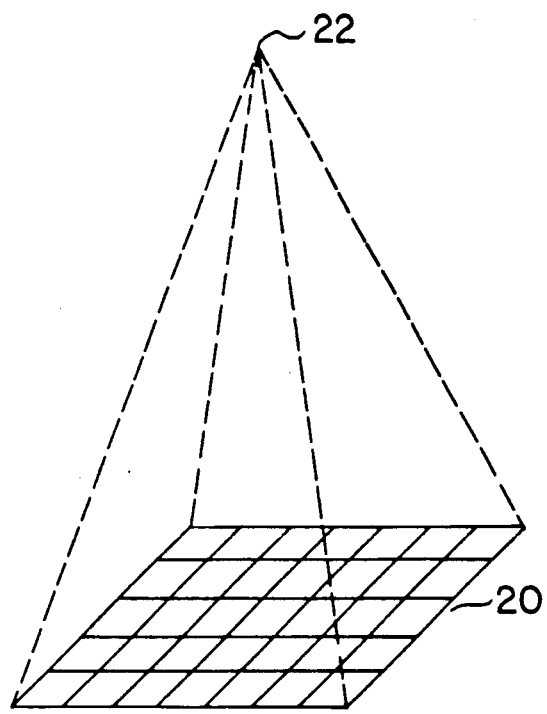
FIG. 5 shows generation of plasma by a heater array.

The AIM ionization layer is created by using this focused power to ionize an area in the atmosphere, as shown in FIG. 5. The microwave breakdown of air occurs where free electrons gain enough energy from an electric field to generate additional free electrons until no more can be generated, thereby resulting in avalanche ionization, or breakdown. This causes the generation of a plasma layer 21. For example, a pulse of power from the heater begins to propagate in the z direction shown in FIG. 5. As the field propagates, more free electrons are generated. A breakdown point descends vertically from the focal point of the propagating field giving thickness to the ionized layer, or plasma layer, until all ionization stabilizes. This "clamping" creates a thin vertical plasma layer.

Simulation results show that when an array 20 is focused at a point 22, electric field power peaks at the focal point. Simulation results shows that given a focused microwave source avalanche ionization, or breakdown will occur at a power level 3-10 dB below the focal point power level.

To create an AIM, the heater array is focused at a desired altitude to maximize power at a point and thereby generate plasma. The heater antenna then "scans" the phase of each array element to move the focal point.

Figure 6:
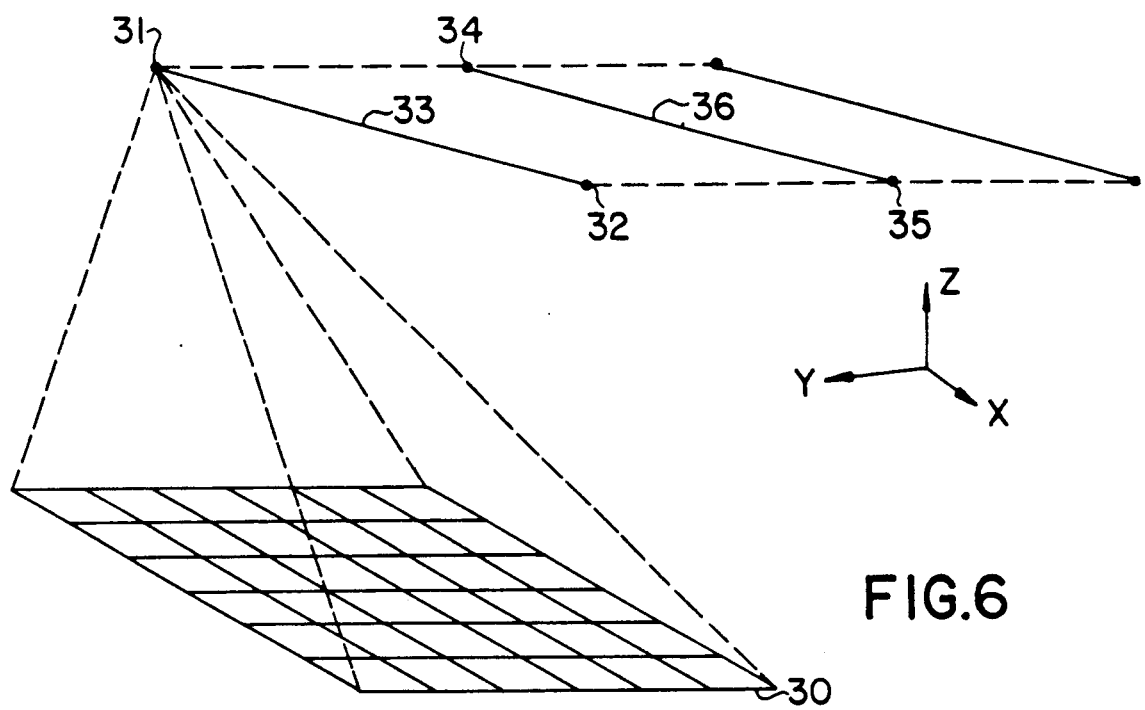
FIG. 6 illustrates generation of a plasma layer by scanning a heater antenna.

FIG. 6 illustrates creation of a noninclined AIM layer. The heater array 30 is first focused at point 31. The heater array scans horizontally by phase shifting to a point 32 creating an avalanche ionization line 33. Next, the heater array scans from a point 34 to a point 35 creating another avalanche ionization line 36. The heater array continues this process to create an ionization plane or AIM layer.

In order to form an inclined AIM cloud, each new ionization line must occur at a slightly higher altitude. By altering the phase or frequency of the array elements, the focal point can be moved up in altitude, as described below.

Figure 7:
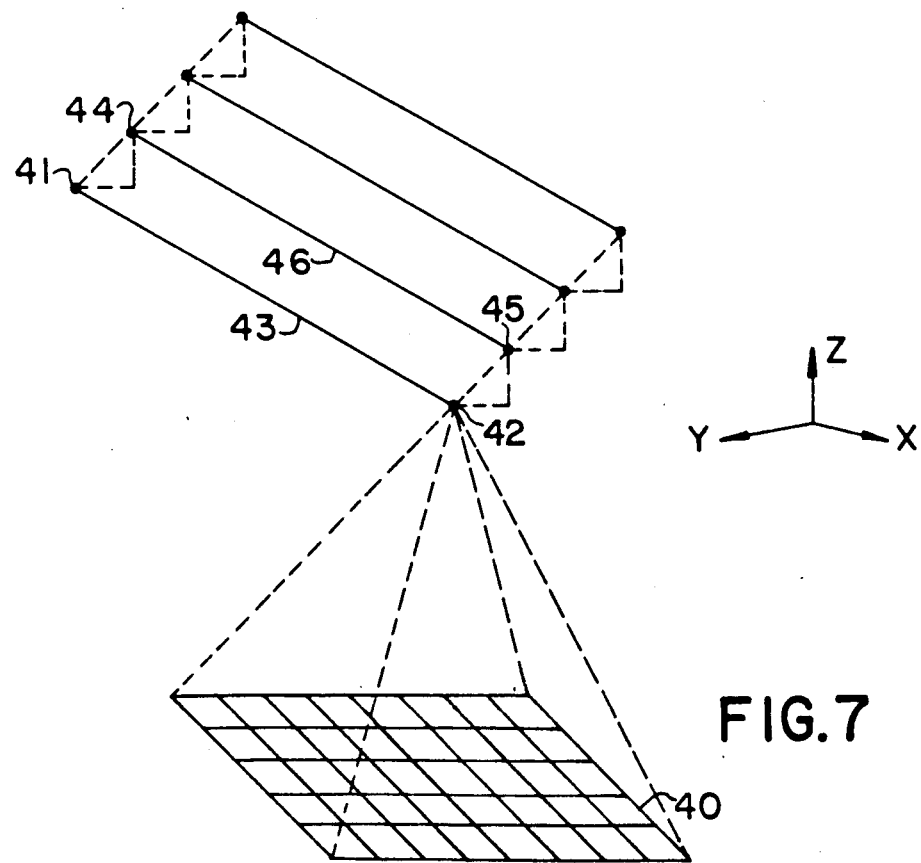
FIG. 7 illustrates generation of a tilted plasma layer by scanning and refocusing a heater antenna.

FIG. 7 illustrates creation of an inclined AIM. The heater array 40 is first focused at point 41. The heater array scans along the x direction to point 42 to generate avalanche ionization along line 43. Next, as in creation of a non-inclined AIM, the heater array scans along the x and y directions directly below point 44. The heater array 40 alters either phase or frequency to refocus to a higher altitude in the z direction to the point 44. The heater array then scans along the x axis to point 45 to create the avalanche ionization line 46. The heater array continues this process to create a tilted ionization plane or tilted AIM layer.

Figure 8:
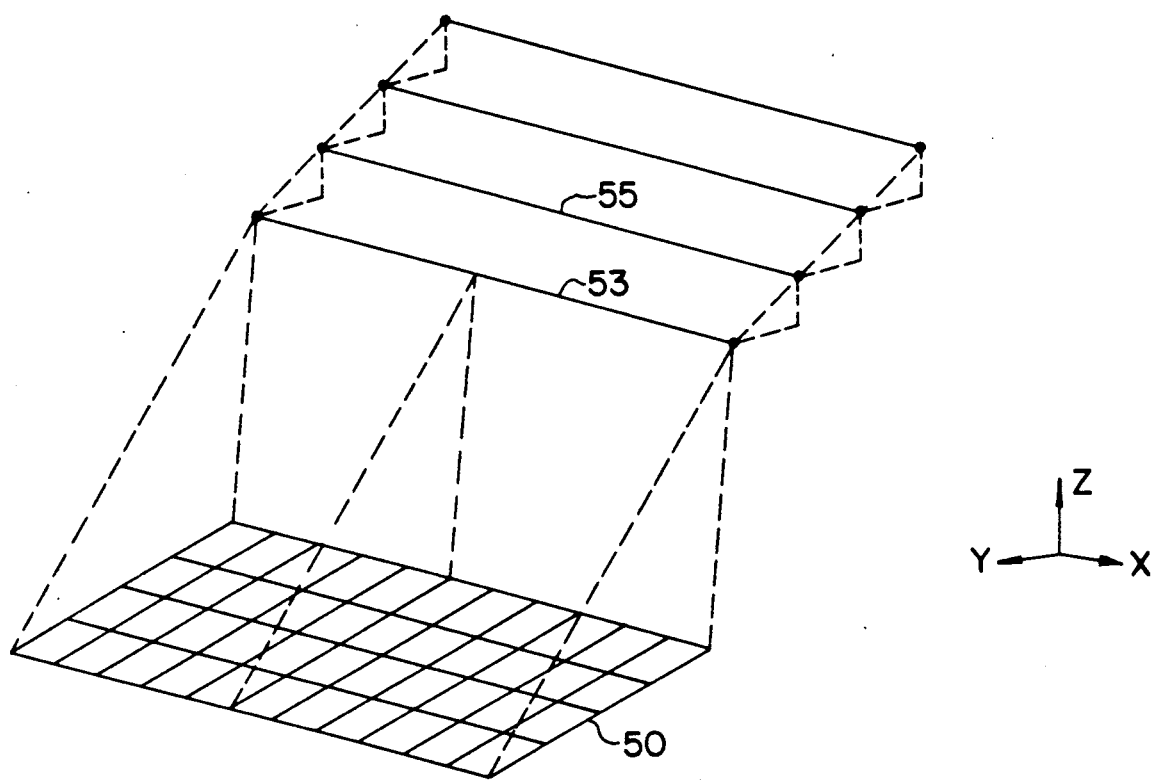
FIG. 8 shows generation of a plasma layer using a heater antenna to scan with a line rather than a point.

FIG. 8 shows that the preferred method of generating a plasma layer uses a heater antenna to scan with a line rather than a point. Scanning using a line is preferred since an AIM can be created in the atmosphere in less time. To create lines of ionization rather than points, a rectangular array 50 is used. In the array 50, radiating elements are focused only along the plane of the long dimension of the rectangular array, creating a line of ionization 53. The array is then scanned along the x-y axis and in altitude along the z axis to create another ionization line 55. More ionization lines are similarly generated to form a tilted AIM layer.

Figure 9:
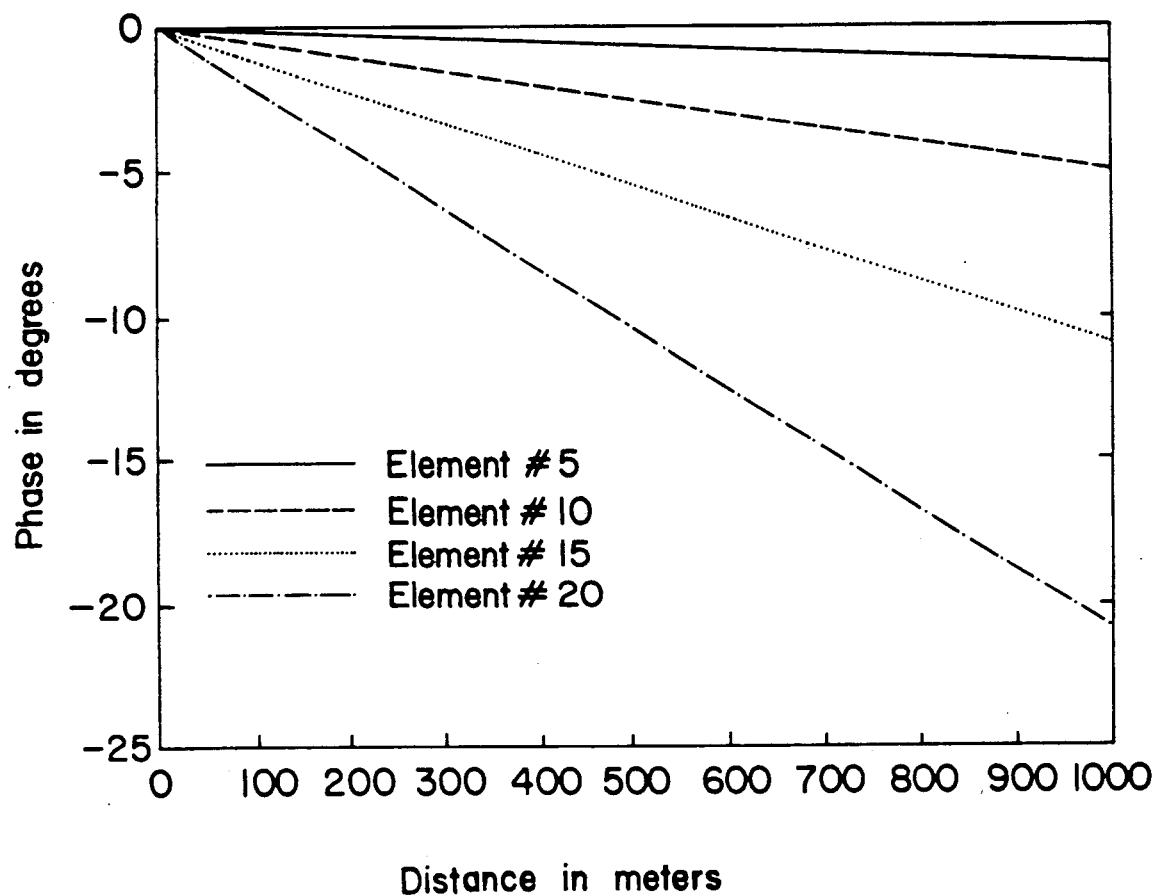
FIG. 9 shows the phase corrections to move the antenna focal point from 60 Km to 61 Km.

In order to create a tilted AIM it is necessary to refocus the heater array at successively higher altitudes. Moving the focal point by changing the phase of each element of the heater in a very precise manner is not practical. Moving the focal point away from the initial location requires changing the phase on each element. The phase change required is near the rms tolerance level, typically 1 degree. FIG. 9 shows the required phase corrections to move the focal point from 60 Km to 61 km. Elements 5, 10, 15, and 20 have distances 5d, 10d, 15d, and 20d, respectively from the center of the antenna, where d=25 meters It is clear from FIG. 9 that it is impractical to alter numerous antenna element phases to move the focal point to create tilted patches for AIM applications. 2000 elements may be required here to generate enough power to ionize the atmosphere.

Figure 10:
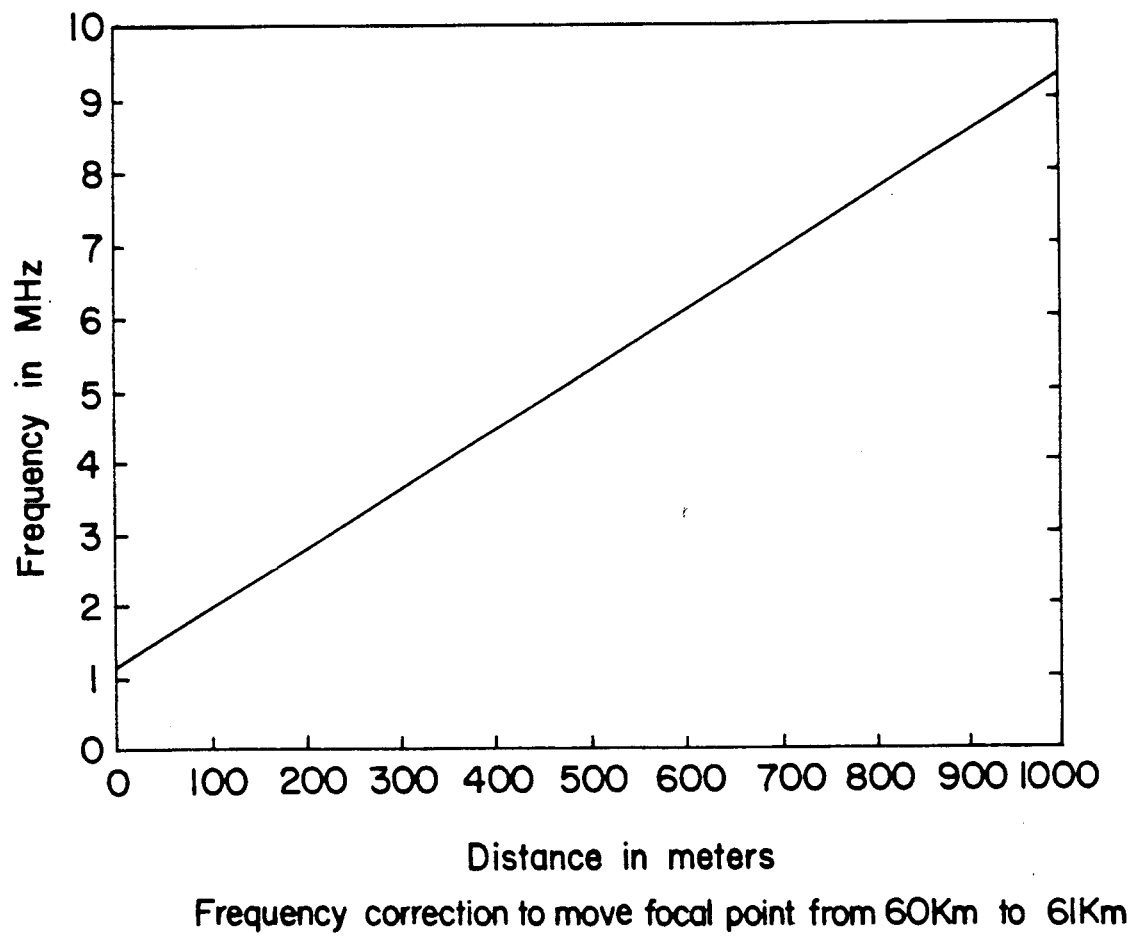
FIG. 10 shows the frequency corrections to move the antenna focal point from 60 Km to 61 Km.

The second method of refocusing is accomplished by first setting the phases of all elements for the initial focal point and then moving the focal point by changing the frequency rather than the phase. This frequency chirping method is less precise, but easier for hardware implementation because precise phases for 2000 elements need not be changed. FIG. 9 shows the required phase corrections to move the focal point from 60 Km to 61 Km. FIG. 10 shows that the focal point can be moved 100 meters by increasing the frequency approximately 1 Mhz. The resulting focal point power levels are not completely optimized, but simulation shows that there is less than a 0.1 db difference between the frequency shifted peaks and those obtained by phasing.

Figure 11:
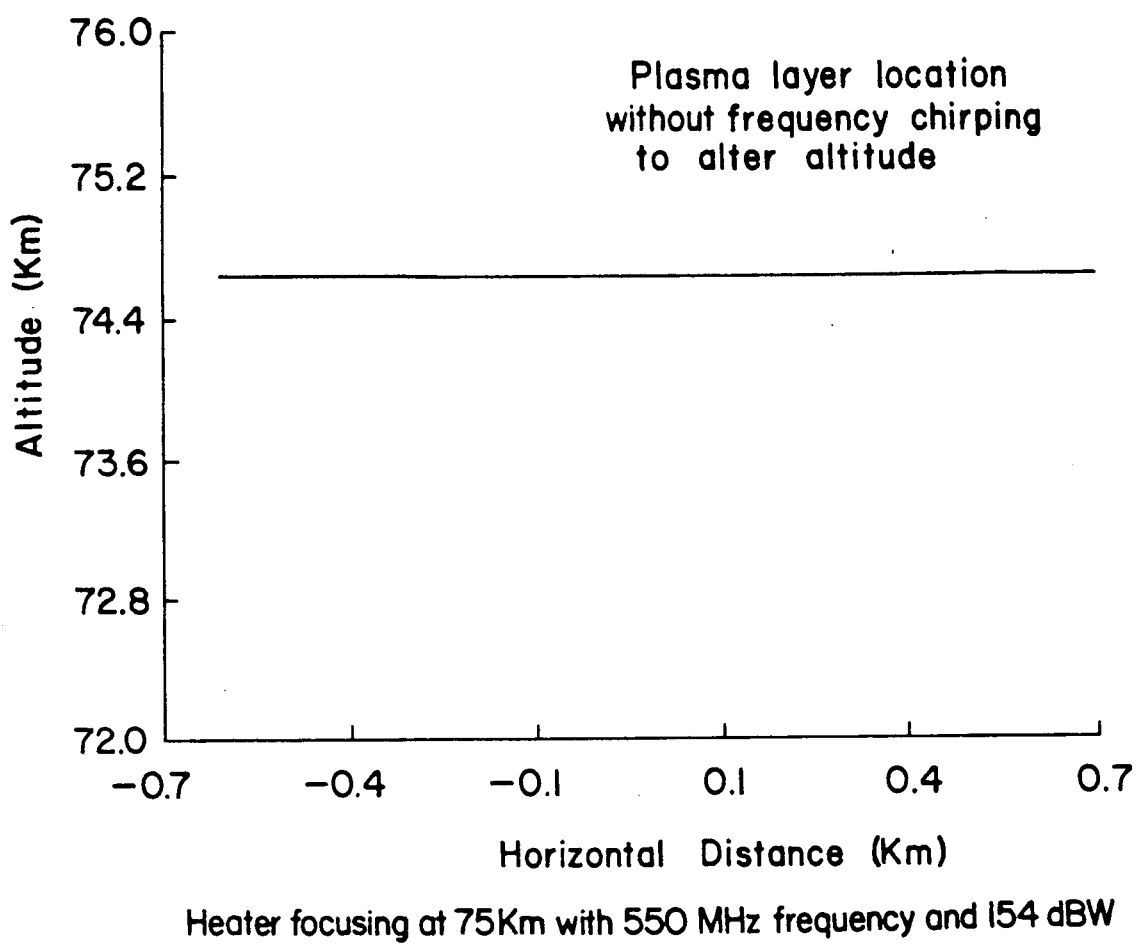
FIG. 11 is a plot of altitude v. distance location of plasma without frequency chirping.
Figure 12:
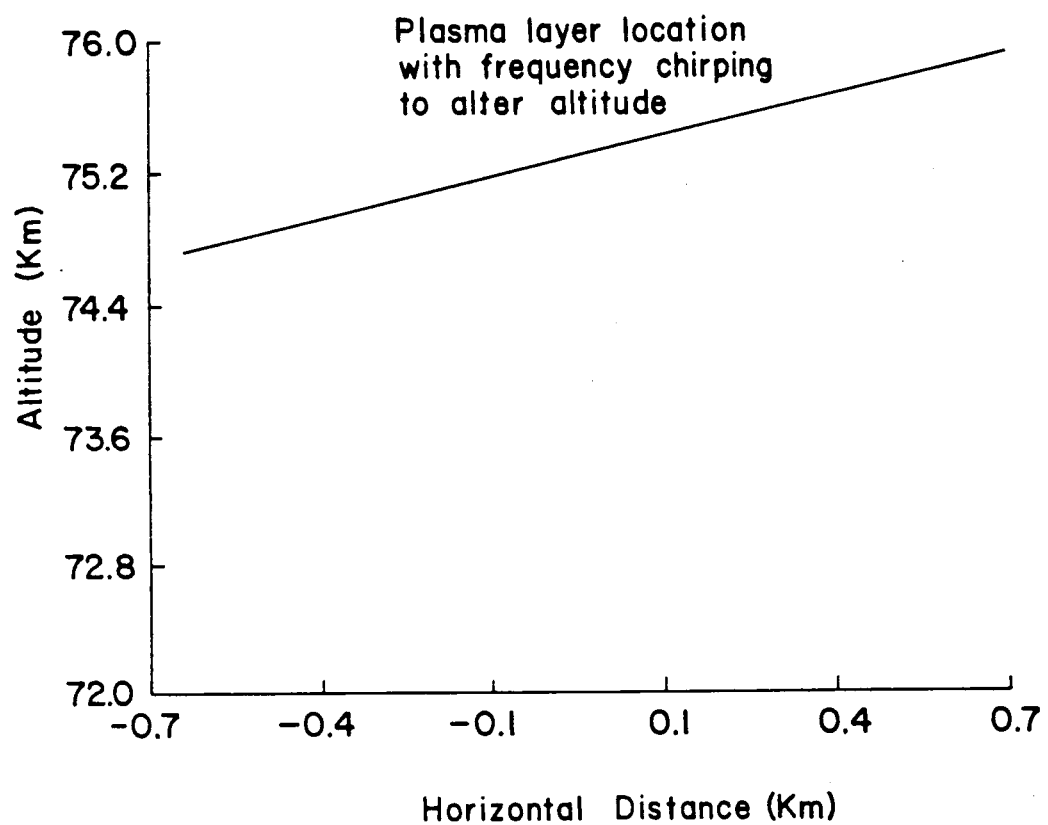
FIG. 12 is a plot of altitude v. distance location of plasma with frequency chirping.

Tilting the AIM using frequency chirping is practical to achieve in a real system. FIG. 11 shows the plasma layer location with no frequency chirping. FIG. 12 shows the plasma location of the same heater creating a tilted AIM by increasing frequency from 550 MHz to 559.375 MHz while scanning horizontally. The result is a smooth patch with a 45 degree inclination.

Figure 13:
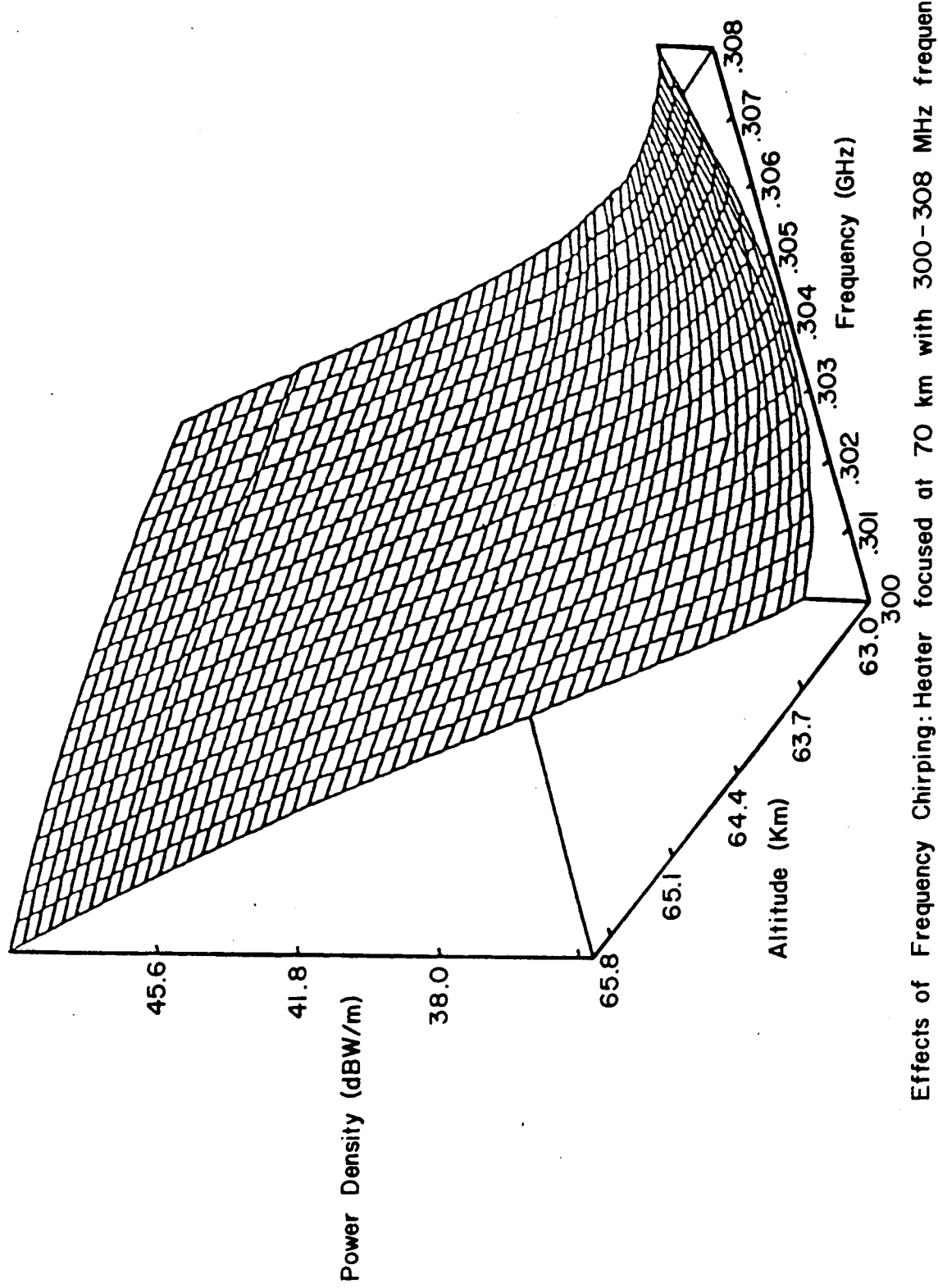
FIG. 13 shows the power density change after refocusing using frequency chirping.

While it is true that frequency chirping does not achieve the same power as phase focusing at the higher altitude, the difference for small frequency chirps is negligible. FIG. 13 shows actual power density data generated by a 300 MHz heater focused at 70 km with the frequency chirped to 308 MHz.

Figure 14:
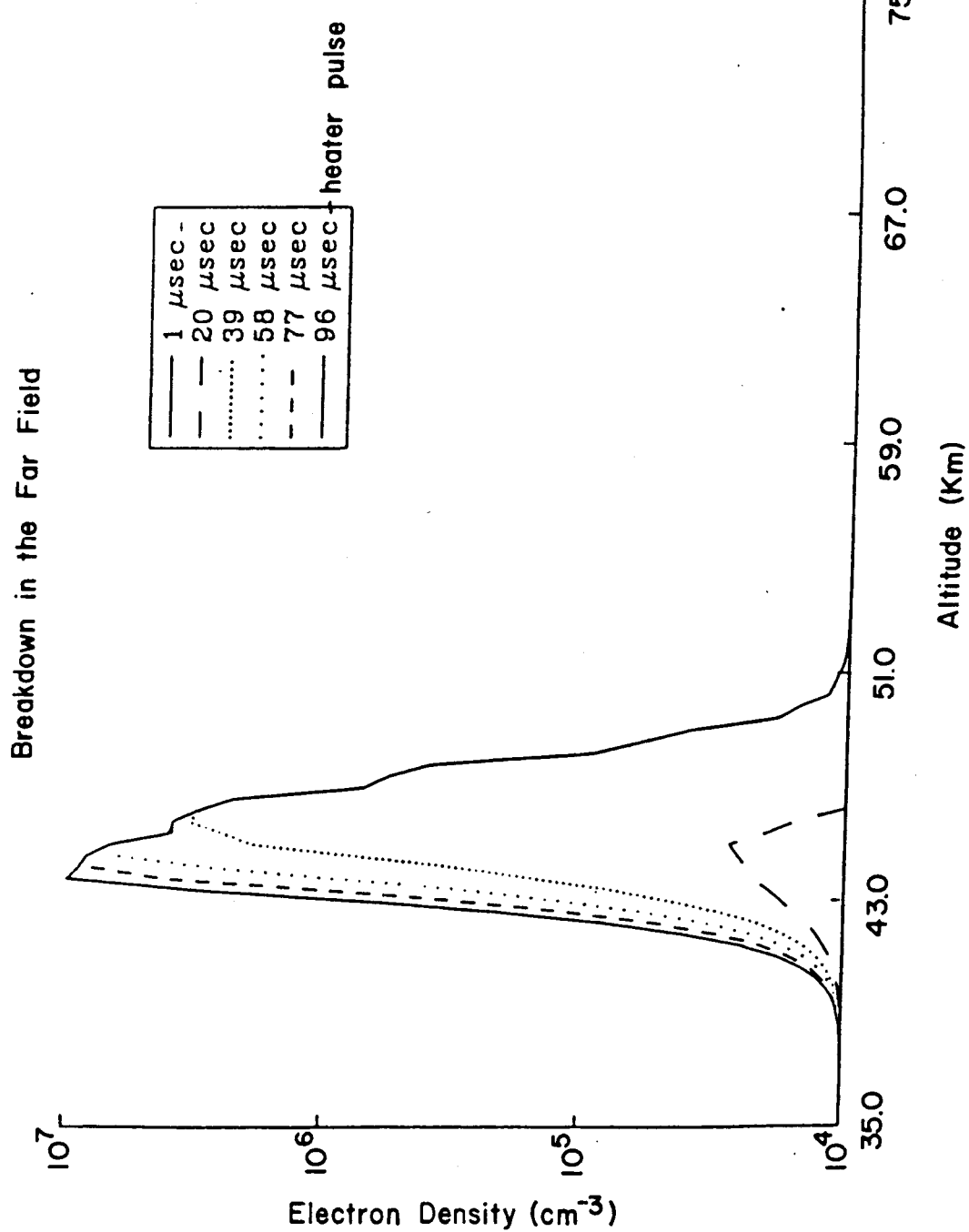
FIG. 14 graphs the free electron density v. altitude for an unfocused array.

In the far field region, power meets its upper bound without focusing. For a far field or unfocused array, there is no way to raise the ionization altitude or create a tilted AIM. Ionization takes place at a point where there is enough power to initiate breakdown and where there is low enough neutral density (i.e. pressure). This usually occurs between 40 and 50 km altitude as shown in FIG. 14. Consequently, a near field focused antenna is required to create a controlled AIM.

The focused pattern is a picture of constructive and destructive interference of the fields from the elements of the array. Other interference positions, or grating lobes, outside the focal point occur when some of the array elements add up in phase. The power of grating lobes can be kept below that of the main lobe, or focal point, by having a large number of elements in the array and spreading them out over the array aperture. This is called thinning the array. For square arrays having 400 elements or more grating lobes can be kept down by 20 db or more from the focal point.

The degree of focusing depends on the ratio of focal range to aperture size. The half power width from peak "V" can be approximated as:

$$V = 2 \cdot g \cdot (R_0/L)^2 \qquad (2)$$

where L is the length of the array which is assumed square for equation 2. The power gradient at the half power point "grad(P)" can be approximated as:

$$grad(P) = 10/V (db/meter) \quad (3)$$

For an AIM it is desirable that the power gradient be high because this directly determines the gradient of the electron density of the generated ionized cloud. The electron density must be high to avoid RF losses caused by absorption. Hence V be small, preferably less than 2 Km. A heater frequency of 300 MHz and a focal distance of 70 Km would project an aperture size greater than 2 Km. Note in equation 2 that array size scales with the square root of frequency.

Since a near field antenna is required, the near field of the heater antenna may be required to extend to reach distant points. This is accomplished by increasing the array size. It may not be economically feasible to fill this entire aperture with elements, hence a thinned array is utilized.

Figure 15:
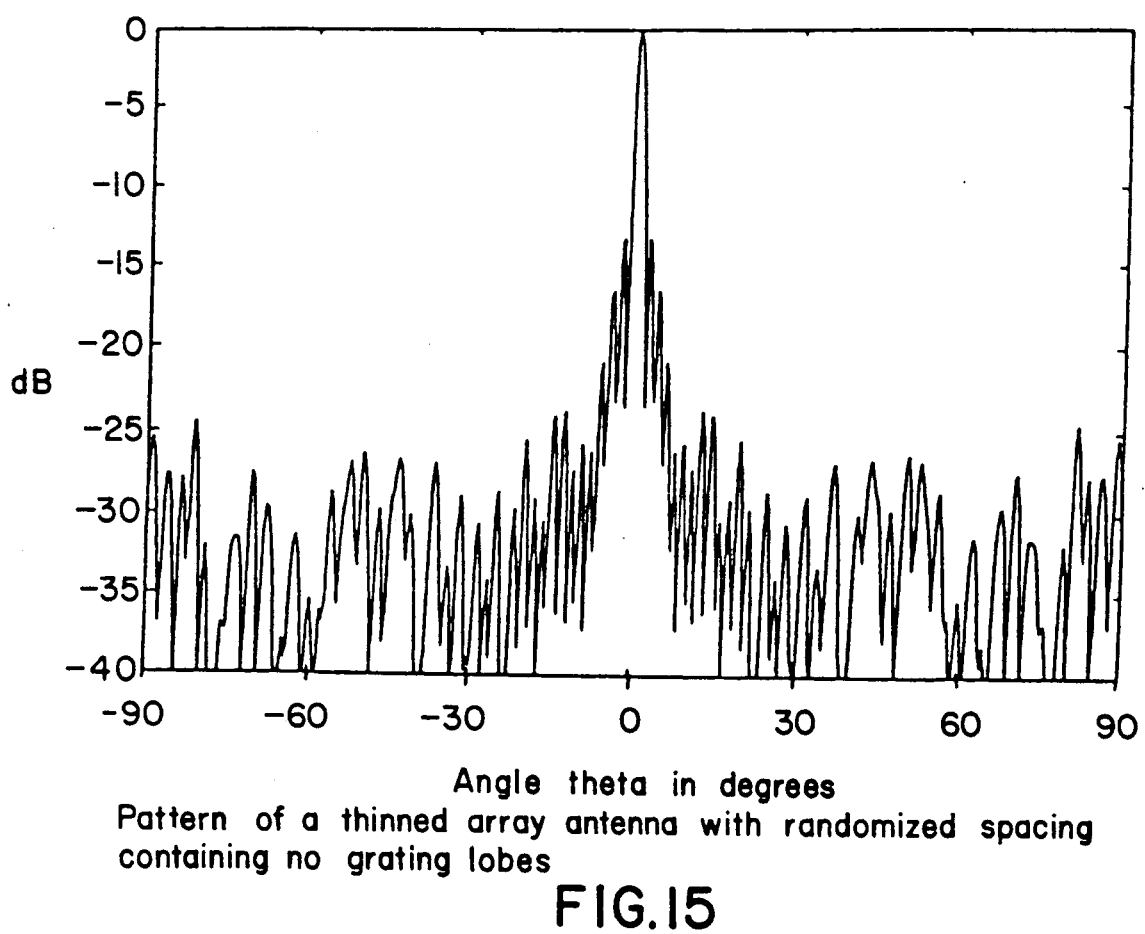
FIG. 15 shows an antenna power pattern without grating lobes.
Figure 16:
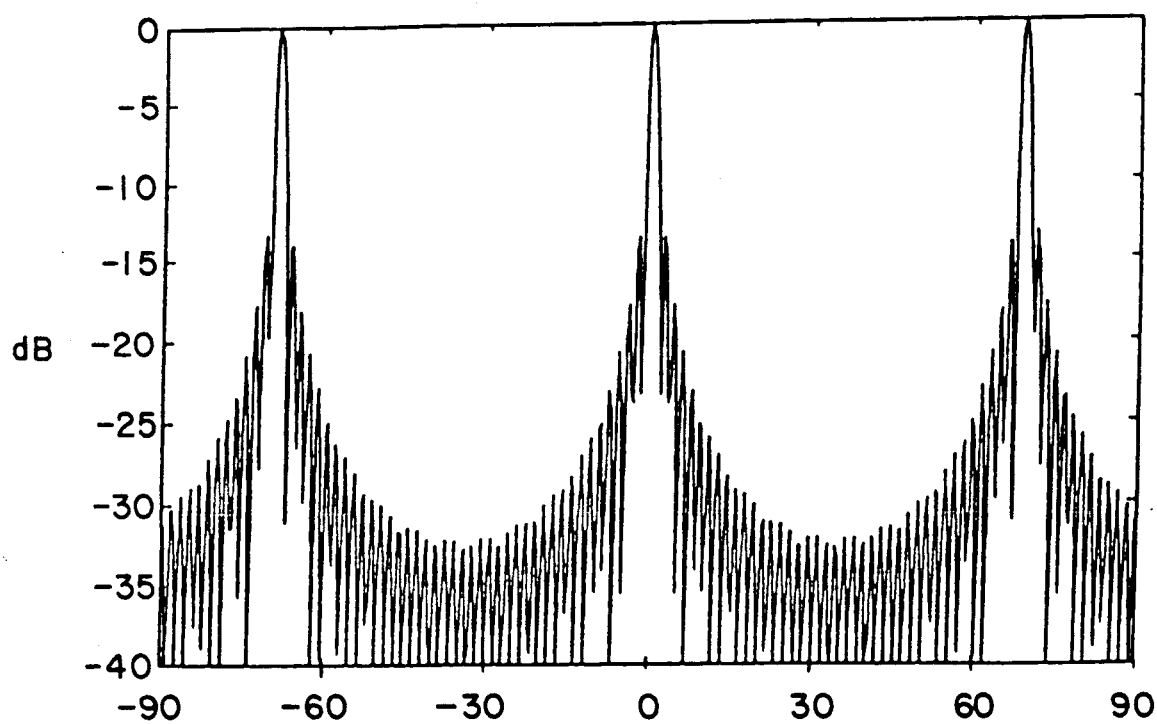
FIG. 16 shows an antenna power pattern with grating lobes.

If a thinned array had its elements uniformly distributed, there would be many grating lobes in the radiation pattern of the array. These grating lobes can be eliminated by randomly spacing elements. However, random spacing puts power from the grating lobes into the average side lobe level. If no new elements are introduced when the aperture is increased, then the peak power of the main lobe remains constant and the main lobe receives less of the total power as its beamwidth decreases. In order to preserve the efficiency of the heater array, grating lobes must be utilized in creating the AIM cloud or the array can not be heavily thinned. FIG. 15 shows an array with uniform spacing having grating lobes. FIG. 16 shows an array with randomized spacing which eliminates the grating lobes.

Although the invention has been described above with particular reference to certain preferred embodiments thereof, it will be understood that modifications and variations are possible within the spirit and scope of the appended claims.

What is claimed is:

1. A method for generating an AIM, comprising the steps of:
    (a) creating avalanche ionization in the atmosphere using a heater antenna;
    (b) refocusing said heater antenna to alter the altitude of said avalanche ionization by frequency shifting said heater antenna; and
    (c) scanning said heater antenna to paint an avalanche ionization layer.

2. A method for generating an AIM as claimed in claim 1 wherein said heater antenna is focused in the near field.

3. An apparatus for generating an AIM comprising:
    (a) a phased array heater antenna which is focused at an altitude to cause an avalanche ionization area to be created in the atmosphere;
    (b) means for controlling frequency of individual radiators of said phased array heater antenna to refocus said altitude of said avalanche ionization area; and
    (c) means for controlling phase of the individual radiators to scan said phased array heater antenna.

4. An apparatus for generating an AIM as claimed in claim 3 wherein said phased array heater antenna is focused to cause said avalanche ionization area to be substantially a line.

5. An apparatus for generating an AIM as claimed in claim 4 wherein said means for controlling phase moves said line substantially at a constant altitude and said means for controlling frequency moves said line to different altitudes.

6. An apparatus for generating an AIM as claimed in claim 4 wherein said phased array heater antenna is a rectangular array and said line is formed parallel to a long dimension of said rectangular array.

7. An apparatus for generating an AIM as claimed in claim 3 wherein said phased array heater antenna is focused to cause said avalanche ionization area to be substantially a point.

8. An apparatus for generating an AIM as claimed in claim 7 wherein said means for controlling the phase moves said point substantially at the same altitude and said means for controlling frequency moves said point to different altitudes.

9. An apparatus for generating an AIM as claimed in claim 3 wherein said phased array heater antenna is focused in the near field.

10. A method of generating an AIM comprising the steps of:
    (a) focusing a phased array heater antenna at an altitude to cause an avalanche ionization area to be created in the atmosphere;
    (b) controlling the frequency of individual radiators of said phased array heater antenna to refocus said altitude of said avalanche ionization area;
    (c) controlling phase of the individual radiators to scan said phased array heater antenna.

11. A method of generating an AIM as claimed in claim 10 wherein said step of focusing causes said avalanche ionization are to be substantially a line.

12. A method of generating an AIM as claimed in claim 11 wherein said step of controlling phase moves said line substantially at a constant altitude and said step of controlling frequency moves said line to different altitudes.

13. A method of generating an AIM as claimed in claim 11 wherein said phased array heater antenna is a rectangular array and said line is formed parallel to a long dimension of said rectangular array.

14. A method of generating an AIM as claimed in claim 10 wherein said step of focusing causes said avalanche ionization area to be substantially a point.

15. A method of generating an AIM as claimed in claim 14 wherein said step of controlling phase moves said point substantially at the same altitude and said step of controlling frequency moves said point to different altitudes.

16. A method of generating an AIM as claimed in claim 10 wherein said step of focusing is performed in the near field.

* * * * *